Aug. 28, 1951   C. R. COLLINS   2,565,547
SAFETY JOINT TOOL
Filed Jan. 18, 1950   2 Sheets-Sheet 1
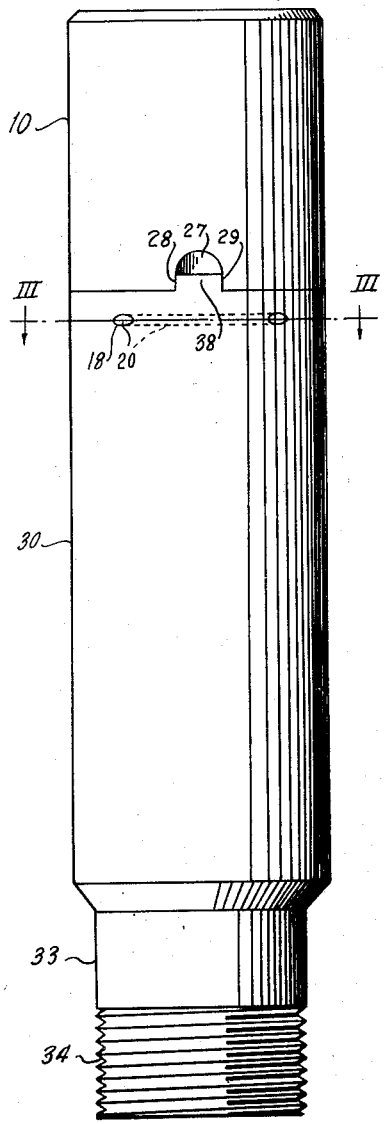
Fig. I
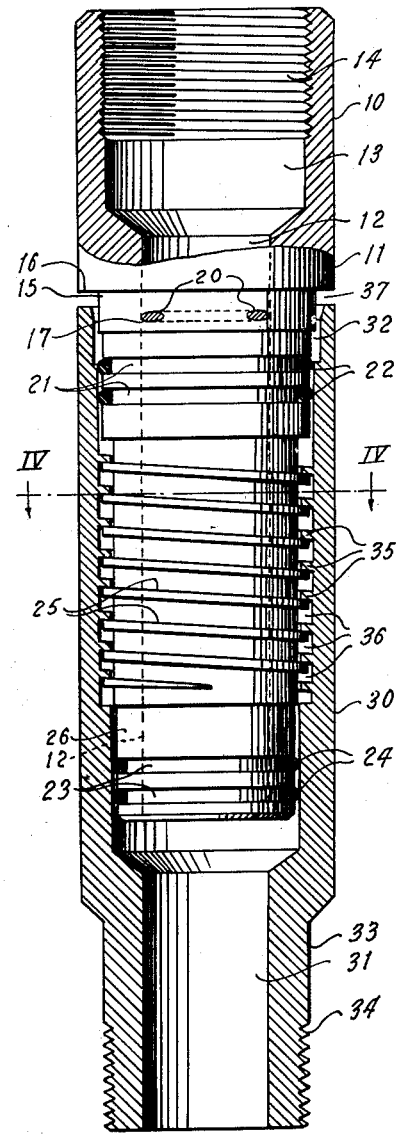
Fig. II
INVENTOR.
Clifton R. Collins
BY
ATTORNEY Aug. 28, 1951  C. R. COLLINS  2,565,547
SAFETY JOINT TOOL
Filed Jan. 18, 1950  2 Sheets-Sheet 2
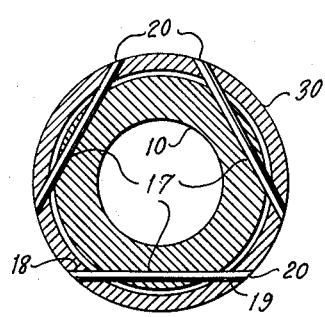
Fig. III
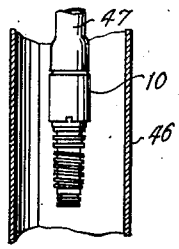
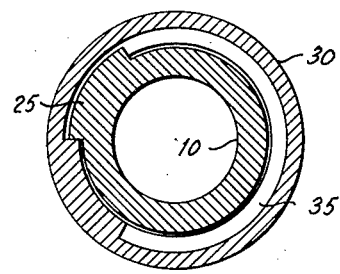
Fig. IV
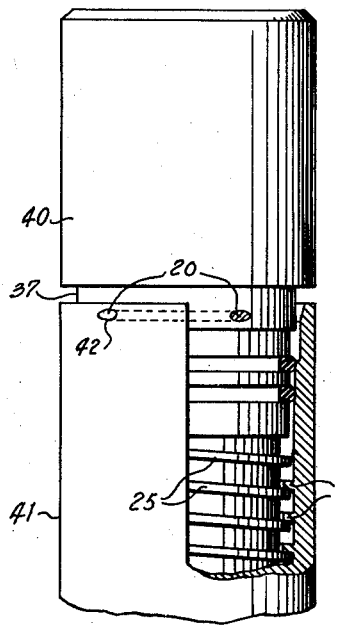
Fig. V
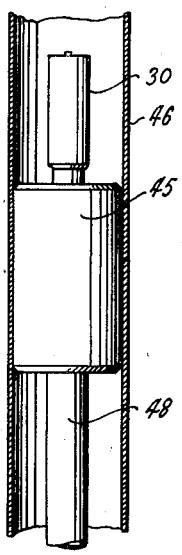
Fig. VII
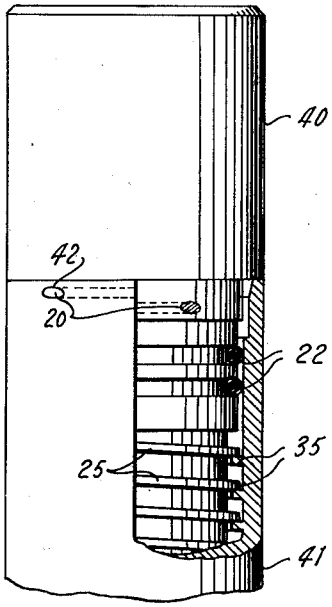
Fig. VI
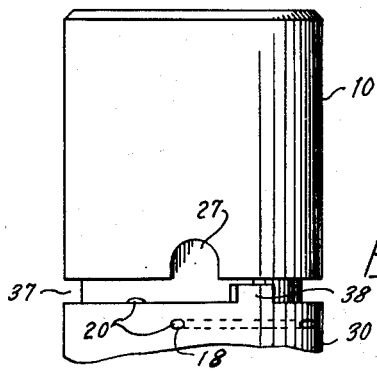
Fig. VIII
INVENTOR.
Clifton R. Collins
BY
ATTORNEY Patented Aug. 28, 1951

2,565,547

UNITED STATES PATENT OFFICE 2,565,547

SAFETY JOINT TOOL

Clifton R. Collins, Dallas, Tex., assignor to The Guiberson Corporation, Dallas, Tex., a corporation of Delaware Application January 18, 1950, Serial No. 139,242

8 Claims. (Cl. 285—146)

This invention has to do with a safety tool which may well be called a safety joint. It is particularly useful in the joinder of parts which may thereafter require severing. Such condition sometimes comes about as a result of accident which renders one of the parts inaccessible, hung up or not recoverable, and it becomes desirable to remove and salvage the other part, together with elements attached thereto. Safety and the protection and salvage of property are important objects of this invention.

The tool which is the subject of this invention is essentially a breakable or severable joint. It is normally used unbroken and as a unit. It comes into greatest use and is of highest value in emergencies. This tool may be employed as a safety device in the drilling and/or operation and/or production of wells of various kinds, such as water wells, gas wells, and oil wells.

One of its most frequent uses is in connection with the employment of tubing in a well. It may also be used in connection with drill-stem or other well pipe, which has to be lowered into a hole and there employed in the drilling and/or production of a well.

A typical use of this safety device may be found in the inclusion of this tool as a short unit or joint within a string of tubing lowered into and/or operated within a well casing. Usually the safety joint is employed at or very near the end of the tubing string.

Certain other tools, used in the drilling, the operation, the production or for the packing or in connection with the lining of a well, may be suspended below the safety joint here exemplified, and usually immediately therebelow. In such case, by far the greater part of the tubing string is placed above the safety joint. However, this safety joint may be put into a string of pipe at any desired location, depending on the work to be done.

Whenever the tools or other pipe or apparatus, carried below the safety joint, may not be removed from the well, because they have become stuck therein, or whenever it is desired that they be not removed, as when the operator wishes to leave in the well a packing element, to pack off or close one area or formation of the well from another, this tool comes into very advantageous use. It may be broken, and a part thereof left in the well with the packer or liner or other element.

Normally and for a great part of the time the safety joint tool has no function other than an ordinary joint within a string of pipe, unless and until it is desired that the string of pipe be broken or disjointed at the place where the safety joint is provided. This usually is done when it is desired to salvage and/or remove all of the well pipe above the safety joint. When this is done, then the pipe below the safety joint which cannot be removed is sacrificed and abandoned, or it is left to perform further function.

The above indicated general objects are accomplished by this invention. More specific objects will become apparent hereinafter.

There have been safety joints used in the past which may be severed or broken only by the employment of excessive torsional force. With such devices sufficient force is applied to simply twist the tool apart, breaking it into two members. This puts an unnecessarily severe stress and sometimes damaging strain upon the long length of well pipe which has to be twisted in order to impart to the tool the torque necessary to break it.

Most well pipe is made up with right hand threads; and in order to break one of these old fashioned safety joints, which can be made to surrender only to excessive torsional force, the regular and standard connections between the many lengths of pipe making up the string are forced and driven together in such fashion as to make their separation very difficult, whenever it is desired that the pipe be separated so that part of it can be removed from the hole. Upon such removal every few lengths (two or three or four) of the pipe must be unscrewed at the surface of the well. To have had them previously forced together with the excessive force required to break these old safety joints which are severed by twisting makes their subsequent disjoining very difficult and expensive.

To obviate some of this trouble there have been made other types of safety joints, which are not altogether satisfactory. One such joint is that made with left hand threads. However, such a joint sometimes comes apart accidentally when the string of pipe carrying it is being rotated in either direction. This is especially true if the left hand threads have become in anywise loosened, as by accident or otherwise. Such outmoded joint held together by left hand threads only is of no practical value whatever in a string of drill-stem, which is constantly rotated and vibrated in the drilling of a well. Such a joint becomes loose. This often results in the unnecessary loss of the entire long string of very valuable pipe.

This invention is a great improvement over the old style left hand "safety" joint; and this invention offers positive insurance against the dangers inherrent in such a dangerous tool.

There are other troubles and objections in the use of old style safety joints which have been made with a thread running in the opposite direction from the rest of the threads which join the several lengths of the well pipe, whether they be right or left hand threads. When such a tool is used, then the operator must necessarily know and determine in advance whether he is going to use a left hand threaded safety joint or one having right hand threads. This means that a well operator or driller must keep on hand both styles of joints, and it doubles his stock of safety joints and the investment therein.

Some safety joints are themselves driven or rotated through a bolt or rod or hook or pin which normally secures and keeps the joint from coming apart. When, in such cases, the securing member is also the driving member, it should be at once apparent that excessive force is required to sever the tool joint. This is especially apparent when one considers that ordinary force is required to rotate the tool joint along with the string of pipe of which it is a part. Excessive rotational force is therefore necessary to break the combination securing and driving element.

In this invention the driving mechanism carries torsional stress; and the securing means is severable only on the application of force exerted longitudinally of the pipe string.

Very cumbersome and elaborate devices and apparatus, expensive to make, and requiring excessive clearance space within the well, are often to be found in connection with previously made so-called safety joints.

Old style ears, latching mechanism, hooks, springs, wedges, and the like have been entirely eliminated by this invention.

The above indicated unsatisfactory forms of construction and unsuitable devices which have been heretofore used are now eliminated and made unnecessary by this invention.

One of the outstanding objects of this invention which has been fully achieved is that in this tool there are but two major parts. These parts have specially made mating threads, coacting between them.

Such threads have been made and arranged in spaced relation, so that the two major parts of the device may be allowed a certain longitudinal motion or slippage or slidable relation with respect to each other. Such clearance permits a longitudinal stroke sufficient to shear the securing pin or member. Upon the severance of this securing member the two major parts of the tool may be moved further apart, so as to disconnect the normally engaged drive apparatus therein. Thereafter the two major parts may be separated by the use of a very low torsional force which quickly and easily unscrews the special threads.

The normal drive relation between the two parts of this invention is maintained by the use of companion lugs and slots, which may be disengaged by longitudinal motion only.

Such a construction allows the entire torque of normal operation to be borne by such driving mechanism, and not by the securing means which has to be severed by force exerted longitudinally. Such longitudinal force will also disengage the driving mechanism and allow the separation of the tool into its two major parts.

This tool has no projection of any kind outside of its wall surfaces. It will pass, without hanging up, into any well or pipe or opening larger than the outer diameter of the body of the tool. It is a straight and smoothly made cylindrical tool.

The tool is preferably made with a standard full opening interiorly, to allow a full passage way, equal to the passage way in the pipe or other conduits connected to it, both above and below. This will allow rods, swabs and other tools to work through this safety joint with the same ease that they may be run through the rest of the string.

Water, oil and/or well fluid is frequently circulated through the pipe string carrying this tool; and it is, therefore, an important object to provide a safety joint tool which will hold its full fluid pressure, without leak, even after the securing means has been sheared or broken; and this is achieved in this invention.

It is an important object that the loose mating threads on the two major members of the tool may be protected from sand and abrasive material and other foreign substances, as well as from water and any corrosive elements, by being properly sealed off, both above and below the loose threads. And the area between the sealing elements may be packed in grease to prevent rusting and galling of the parts and of the threads thereon.

This safety joint tool may be operated indiscriminately, either to the right or to the left, without the slightest damaging effect upon the means securing together the two major parts of the tool, or upon its normal attachment to the pipe carrying it, or upon the threaded joints holding together the several lengths of pipe forming the string of which the tool is a part. One does not have to determine in advance whether a left hand drive is to be used or right hand drive is to be used on the string of pipe in which this safety joint is placed.

The operator may proceed with perfect confidence and complete safety to employ this tool as a part of any string of pipe, regardless of the character of the threads joining the pipe and regardless of the direction of rotation of the pipe string; and the tool will never come loose, break or separate until he applies force in a longitudinal direction and of such intensity as to shear or sever the means employed to normally secure the two major parts of the tool against relative vertical slippage.

Typical views of suitable forms of this safety tool joint are illustrated in the accompanying drawings, in which:

Fig. I is an elevational view of a typical safety joint tool of preferred form.

Fig. II is a sectionalized elevational view of the tool shown in Fig. I, taken after the securing pins have been sheared by tension, and the tool is in initially extended position.

Fig. III is a view taken along line III—III of Fig. I.

Fig. IV is a view taken along line IV—IV of Fig. II.

Fig. V is a partially cutaway elevational view of the upper end of a modified form of safety joint tool, before securing pins have been sheared.

Fig. VI is a view of the modified tool shown in Fig. V, except that securing pins have been sheared by compression, and the tool is in shortened position.

Fig. VII is a schematic elevational view of the tool shown in Fig. I after it has been so separated as to leave its lower part with a packer set in well pipe.

Fig. VIII is an elevational view of the upper part of the tool shown in Fig. II after the tool has been partly unscrewed.

Although suitable forms of devices exemplifying this invention have been illustrated in the drawings, further modifications of the devices may be made employing the principles of the invention without departing therefrom.

In the drawings the various parts and members of the structures have been indicated by numerals; and like parts have been given like numbers.

A typical safety joint tool is made of two separable major members; and these may be well seen in Figures I and II, wherein: The numeral 10 indicates the body of the tool which may be considered as the head member; and it is also the driving member of the assembled tool.

The other major member is indicated as at 30; and it comprises a barrel or casing member. The barrel encases the lower and threaded part of the body member 10, and constitutes the lower half of the safety joint tool. It is this part of the tool which remains in the well when the tool is broken and separated, the body 10 being withdrawn therefrom.

The exposed head part of body 10 is indicated by the numeral 11. The entire body is normally provided with a passageway therethrough, such as the normal bore 12, which may be enlarged within the head 11, to provide the greater bore 13, in which will be found the internal threads 14. These threads are companion to and complement external threads (not shown) which may be found on the end of the tubing or drill stem 47.

The entire tool, assembled as a unit, may be made up into a part of a string of pipe (47—48); and may be located anywhere in such string as the operator may desire.

Obviously, the enlarged bore 13 may be reduced in size, if desired, so that it is substantially that of normal bore 12; and in this case the internal threads 14 may be dispensed with, and external threads (not shown) may be provided around the upper part of head 11, to receive ordinary pipe couplings, such as are found in a string of tubing, drill-stem, or the like.

Below the head 11 of body 10, there will be found a depending shank 15. This shank has a smaller diameter than the head 11; and at their juncture there is provided the shoulder 16.

A transverse hole 17, or a plurality of such holes, as indicated in Figure III, should be provided in the side wall of shank 15, and in its upper part, in a position spaced below shoulder 16. The location of this hole 17 with respect to such shoulder and with respect to the upper end of the wall of barrel 30, when the tool is completely assembled and ready for operation, as a matter of some importance, and also of choice. The exact positioning of the hole 17, whether above or below a given level, may determine whether shear pin 20 is to be severed by tension or by compression.

When the transverse hole 17 is placed at the highest permissible elevation, then pin 20 may be sheared only by tension (as when the barrel 30 becomes stuck or immovable in the well, and the body 10 is lifted up with considerable force).

When the hole 17 and pin 20 carried thereby are located at the lowest permissible level, then the pin may be sheared by compression, as by allowing the great weight of a thousand feet of pipe, or several thousand feet of pipe, and other added weight as desired, to be thrust downwardly and carried by the pin until it is broken.

The horizontal plane in which hole 17 is placed may be varied, as desired, and as indicated above. However, it must be borne in mind that the level of holes 18 and 19, arranged in the wall of barrel 30, has to be considered. For instance, holes 18 and 19 may be so located as to thereby determine how and in what manner the pin is to be sheared, by tension or by compression, without the need of changing the location of hole 17. That is to say, the true relation, which determines the nature of the force required to shear the pin, is the relation between the level of holes 18 and 19, on the one hand, and the level of hole 17 on the other.

If these companion holes, located in body 10 and in barrel 30 respectively, are so placed as to leave no slip clearance 37 between the upper face of the wall of barrel 30 and the shoulder 16 of body 10, when the tool is made up, pinned together and secured as a unit, then the pin 20 may be sheared by tension only. Where slip clearance 37 is provided the pin may be sheared by compression.

Therefore, by the simple device of locating related holes in the two major members of the tool, the manufacturer may quickly and inexpensively predetermine the nature and direction of the shearing force required to break the pin. This provision is simple and important, notwithstanding that it may be employed without added manufacturing cost. It is an elective, an alternate.

Suitable structure in which the pin may be sheared by pull or tension is shown in Figures I and II. In the modified forms disclosed in Figures V and VI it will be seen the structure in which the pin may be sheared by compression or down-thrust.

In preferred construction, holes 18 and 19 in barrel 30 are arranged segmentally through the side wall of such member, and in a single or common plane; and these holes are aligned with hole 17 in the body when the tool is finally made up and secured together for normal use as a joint in a string of pipe.

In preferred forms of the device, there should be provided one or more upper annular recesses or packing grooves 21, in which may be carried packing material or packing rings 22, to effect a fluid-tight seal around the upper part of shank 15 within the barrel or casing 30.

In a suitable form of the device, the lower part of body 10 may be provided with a reduced shank 26, of smaller diameter than the normal shank 15, from which it depends. On the reduced shank, at the lower end of the body, there may be provided the packing recesses 23 to carry packing material or rings 24. This arrangement will provide a fluid-tight seal near the base of the barrel 30 and near the end of the body 10.

By arranging suitable seals, of which the aforementioned are good examples, the barrel 30 may be arranged in slideable relation with the body 10 without permitting leak of fluid, even though it may be under great pressure, from the inner passage way of the tool, notwithstanding that the members 10 and 30 may be either telescoped or extended, or permitted relative slideable movement.

Such sealing means affords additional function. Through the use thereof the space extending between upper and lower packing rings (22—24), surrounding body 10 and within barrel 30, may be filled or packed with grease or other other heavy lubricants to protect that area, and the certain special loose threads arranged therein (which will be hereinafter explained in detail) from abrasion, from rusting, from galling, or other damage. Foreign matter will be prevented from entering the sealed off and lubricated section of the tool. And the body and barrel will slide freely when unpinned.

Loose male threads 25 are provided around shank 15, between the upper and lower sealing rings. These threads are not only free-running, but they have an abnormal spacing. This spacing provides a definite and measured clearance 36, which clearance exists even when companion threads 35 on the inner face of barrel 30 are made up about the threads 25 on the shank of body 10. Threads 35 should be loose, free-running threads, arranged in definite spaced relation to permit the rotation therebetween of threads 25 and the leaving of thread clearance 36. Thread clearance normally provides at least the spacing provided by sliding clearance 37, and equals or slightly exceeds the height of lug 38.

Male threads 25 and female threads 35 may be fashioned as tapered threads if desired, but it is preferable to make them square threads or substantially square. The bottom or trough between any two threads (whether male or female) is preferably made straight, so that the crest of the companion thread working in this trough may slide easily therealong.

In a preferred form of the device, as shown in Figures I, II, and VIII, will be found a keyway 27, which may take the form of a recess or slot in the outer face or wall of the head 11 of the body 10, or any other suitable form. It is cut or fashioned or cast in the shoulder 16 and arranged to extend upwardly therefrom a slight distance. This distance should at least equal slip clearance 37, and thread clearance 36. A ledge 28 may provide a drive wall on one side of the keyway 27, which we may call the left hand drive wall. Opposite thereto may be provided the ledge 29 which may be considered as the right hand ledge or drive wall. Such ledges with finger 38 provide a lock against relative rotation.

The ledges 28 and 29 will drive a key or finger or lug 38, which may be passed into the keyway 27. With such arrangement it will be seen that lug 38 may be driven either to the right or to the left; and since lug 38 is carried as an extension or part of barrel 30, then the latter may be driven either to the right or to the left. During such driving operations there will be no torsional stress whatsoever placed upon securing pin 20.

It is preferred that the finger or key or lug 38 be arranged and constructed as an upwardly extending part of the side wall of the barrel 30. With such construction, there will be no outward projection whatsoever from either the head 11 or the barrel 30, by which both major parts of the tool are driven or made to rotate together.

Ordinarily, the lower part of barrel 30 is provided with a reduced section 33 in which there is arranged the reduced bore 31. Such reduction is optional. External threads 34 may be provided around the lowermost end of the barrel so that it may be connected to a pipe coupling or an internal threaded casing of whatever kind may be found suitable. These threads may be used to attach a tool to be carried below the safety joint, such as a packer, which is to be set and left in the hole, along with the barrel part of the tool, after the body of the tool has been separated and withdrawn.

If desired, the lower end of the casing may have an external diameter equalling that of its upper end; and the lower end may be internally threaded, as with threads comparable to threads 14, so as to receive an externally threaded member, such as that shown as at 47.

There should be provided an annular space 32 arranged within the uppermost part of the barrel 30; and such space may be provided by simply cutting away the inner face of the wall of the barrel in this area. This will make the diameter of such area slightly greater than the maximum diameter of that part of the barrel remaining therebelow.

An annular space similar in function to that shown as at 32 may be provided, if desired, by reducing the external diameter of shank 15 in its uppermost part sufficiently to provide such space. When the shank is so reduced in this area it will not be necessary to increase the internal diameter of the barrel in such area as aforesaid. However, a slight reduction in the external diameter of the shank and a slight increase in the diameter of the barrel may be arranged in the desired area so that these arrangements may afford the necessary annular space, part of it being provided by the shank and the remaining part by the barrel.

However formed, the annular space 32 is of importance. It prevents immediate contact between the shank and the barrel within the area thus provided. There will be no frictional contact whatever between these members in such area.

The provision of such space allows the securing pin 20 to be broken and severed therein without leaving sufficient projection of the broken pin, either from the wall of the body or the wall of the barrel, to permit the rough ends of the broken pin to engage or cut or mar either of the opposed walls of the body or the casing thereabout or to hang up thereon. There will be no digging in by exposed fragments of the severed pin 20, and no damage can be done to the tool by jagged or rough projections of the pin, especially when the barrel or casing 30 slides along the body 10, and specifically along the shank 15, for the short distance permitted by thread space 36, after the severance of pin 20.

Furthermore, there will be no damage done to the tool, and especially its wall surfaces, when the barrel is being rotatably removed from the body.

Without such construction and arrangement of the annular space 32, or its equivalent, damage may be done to the tool while it is assuming and passing through the position shown in Figure VIII. In such figure the pin 20 has been severed. Part of it remains in the body 10 and part of it remains in the barrel 30; and when these members are initially moved apart so as to release the lug 38 from the recess 27, as shown in Figure VIII, the broken end of pin 20, extending from body 10, could cut into the inner face of barrel 30. Likewise, the internally projecting broken end of the part of pin 20 remaining in the barrel 30 could score and hang up on shank 15, and damage it, were it not for space 32.

As shown in Figure VIII, after the pin is sheared, the body and the barrel may be further moved apart by rotating the latter, as desired, after lug 38 has been disengaged; and during such rotation damage could be done throughout the tool were it not for the provision of the specially arranged annular space 32.

The safety joint tool may be modified in form and construction and present an arrangement employing securing pin 20 so that it may be severed by compression, as by downward thrust upon the modified head 40 in Figure V.

In Figures V and VI appear examples of this modification. In the former, body 40 and barrel 41 are secured together through the use of pin 20 which is here relocated (as contrasted with the location shown in Figures I and II).

In Figure V, the head and shoulder part of the body are definitely spaced from the upper end of the wall of barrel 41 by relocating the pin hole in a new and elevated position. With pin hole 42 thus located, the tool is secured together by the use of pin 20, or a plural number thereof.

Thus made up the modified safety joint tool is used in a string of pipe until circumstances require the severing of the pin and the disengagement of body 40 and barrel 41. The pin is then severed by placing a great weight on and above body 40 until the downward thrust thereof is sufficient to shear the pin. Immediately thereafter the tool assumes the collapsed position shown in Figure VI.

If at such time the barrel 41 is stuck or fastened in the well, or tools or pipes carried therebelow are caught in the well pipe or well casing in a fixed position, then the barrel 41 and all material and equipment attached thereto and therebelow may be abandoned and left in the hole by the simple operation of rotating body 40 to the right until complementary threads 25 and 35 are disengaged and the two major parts of the tool are freed from one another.

When the construction set forth in the modified form of the device shown in Figures V and VI is employed, then the size and physical characteristics of the securing pin 20 must be considered. Such pin must be of such construction, size, material and/or quantity, in this modified form, to permit the normal driving and rotating of the tool without severing the securing pin.

The pin must be so made that the normal torque in rotating the pipe string in which the modified safety joint is incorporated is not sufficient to sever the pin. However, the pin is to be made severable by the greater thrust downward which is occasioned by throwing a very heavy weight upon the tool from above.

This modified form presents a simpler and less expensive design of safety tool joint. It is distinguishable from the preferred form shown in Figures I and II not only in the relocation of holes carrying the securing pin or pins, but in the elimination of the keyway 37 and of the lug 38.

Thus it will be seen that in both forms of the tool, exemplified in Figures I and V, the securing pin 20 may be severed by longitudinal thrust. After the pin is severed the two major parts of the tool may be separated in the same manner in both forms of the device.

Obviously threads 25 and threads 35, which are shown in the drawings as left hand threads, may be formed as right hand threads. In either form of thread construction the securing pin or pins will be severed by forces tending either to slide the barrel and the body together or apart along the line of the axis of the tool. That is, the tool may be either forcibly telescoped or extended to initiate the release of its two separable and major members.

Forces other than those of torque are, therefore, employed in this invention to dismember and release the major parts of the tool from one another so that the operator may recover the body part thereof, together with all pipe, tubing, tools and apparatus below which the safety joint tool in its entirety was originally placed.

This tool is, therefore, one of simplicity in operation notwithstanding its great strength, dependability, certainty and safety, whether used as releasing tool, a setting tool or a severable safety joint.

Having described my invention, I claim it as hereinafter set forth.

I claim:

1. In a safety joint tool, a body provided with loose exterior threads; a casing provided with loose interior threads whereby the casing is initially attached to the body, the looseness in the threads being sufficient to allow limited longitudinal movement between the body and the casing; and a pin connecting the body and the casing in a fixed position to prevent longitudinal movement until the pin is sheared.

2. In a safety joint tool, a body having a recess in its peripheral face to provide a drive shoulder, the body being provided with loose exterior threads arranged below such recess; a casing having a lug arranged as a vertical extension of its outer wall and adapted to be rotatably driven by such shoulder, the casing being provided with loose interior threads whereby the casing is initially attached to the body, the looseness in the threads being sufficient to allow limited longitudinal movement between the body and the casing; and a pin connecting the body and the casing in a fixed position to prevent longitudinal movement until the pin is sheared.

3. In a safety joint, an exteriorly threaded cylindrical body; an interiorly threaded casing arranged thereabout, the threads being so spaced and constructed as to unite the body and the casing in a connection allowing limited longitudinal movement therebetween; an annular space defined about the body wall and within the casing wall; a pin traversing such space and penetrating the oppositely disposed walls of the body and the casing whereby said longitudinal movement is prevented until the pin is broken; and the annular space being of such size and arrangement that the rough ends of a pin broken therein will not damage the walls defining such space while the body and the casing are being separated.

4. In a safety joint, an exteriorly threaded cylindrical body; an interiorly threaded casing arranged thereabout, the threads being so spaced and constructed as to unite the body and the casing in a connection allowing limited longitudinal movement therebetween; an annular space defined about the body wall and within the casing wall; a pin traversing such space and penetrating the oppositely disposed walls of the body and the casing whereby said longitudinal movement is prevented until the pin is broken; the annular space being of such size and arrangement that the rough ends of a pin broken therein will not damage the walls defining such space while the body and the casing are being separated; a keyway recessed in the outer face of the body; and a key arranged to extend above the top of the casing wall and adapted to penetrate said keyway whereby relative rotative motion between the body and the casing is prevented until the pin is broken and the body and the casing have been slidably extended.

5. In a safety joint tool, a cylindrical body provided with: a head having a keyway on the outer face thereof, a shank depending from the head, male threads on the shank, and a hole in the wall of the shank; a barrel adapted to encase said shank and being provided with: a lug projecting above the wall of the barrel and adapted to penetrate said keyway, female threads on the inner wall of the barrel, and a hole in the wall of the barrel; the male and female threads being so constructed as to mate loosely and allow longitudinal movement therebetween, the extent of such movement being at least equal to the extent of the projection of the lug above the wall of the barrel; and a pin carried in both of said holes when the lug lies in the keyway and adapted to be sheared when the body and the barrel move apart to free the lug from the keyway.

6. In a safety joint tool, a body and a barrel, they being slideably related; the body being provided with: a head, a shank depending from the head, a keyway arranged in the head, loose male threads on the shank, a pair of packing recesses on the shank, one above and the other below the threads, a hole through the wall of the shank; packing arranged in said recesses; the barrel being provided with: a lug extending above the wall of the barrel and adapted to pass into the keyway, a hole through the wall of the barrel, loose female threads on the inner wall of the barrel; a shear pin arranged to fit into both of said holes when the lug is in the keyway; and the male and female threads being so loosely related as to allow longitudinal movement therebetween to an extent sufficient to permit the lug to slide out of the keyway when the pin is sheared.

7. In a safety joint, a body member provided with exterior threads; a barrel member provided with interior threads and arranged to encase the threaded part of the body, the respective threads being so spaced apart as to allow limited longitudinal movement between the members; one of the members being provided with a slot and the other member being provided with a finger normally extending into said slot, whereby relative rotation between the members is prevented; and a pin penetrating both members so as to normally prevent longitudinal movement between the members, the pin being shearable only by stresses tending to effect longitudinal movement between the members, and the shearing of the pin allowing the release of the finger from the slot and rotation between the members.

8. In a safety joint an elongated hollow body; a barrel partly encasing such body, both body and barrel being provided with loose companion threads whereby said members are loosely connected in a relation of limited slidable engagement; a locking lug provided on one member and adapted to so engage locking means arranged on the other member as to prevent relative rotation between the members; and a shearable pin normally connecting said members in locked position.

CLIFTON R. COLLINS.

REFERENCES CITED

The following references are of record in the file of this patent:

UNITED STATES PATENTS

| Number | Name | Date |
|---|---|---|
| 1,243,364 | Walker | Oct. 16, 1917 |
| 1,777,481 | Black | Oct. 7, 1930 |